Patented Sept. 16, 1947

UNITED STATES PATENT OFFICE 2,427,504

PRODUCING ALDEHYDE-PROLAMINE REACTION PRODUCTS

Willard L. Morgan, Columbus, Ohio, assignor, by direct and mesne assignments, to American Maize-Products Company, a corporation of Maine No Drawing. Application July 22, 1944, Serial No. 546,227

18 Claims. (Cl. 260—123)

This invention relates to protein compositions and to means for producing the same. More specifically, this invention relates to the aldehyde curing of prolamine compositions, and to means for controlling the curing.

It is well known that prolamine, for example zein, hordein, gliadin, and the like, react with aldehydes such as, for example, formaldehyde, glyoxal, and acetaldehyde, to form new compositions generally useful as plastics. Depending upon whether or not various materials such as plasticizers and fillers are incorporated, and upon conditions of operation, there may be produced a diversity of compositions of widely varying properties and of potentially widespread commercial utility. For example, many types of prolamine aldehyde plastics may be molded by conventional hot molding processes to produce formed articles, such as buttons, buckles, cigarette boxes, door knobs, and the like. In other applications, processing of prolamine aldehyde compositions has been modified to permit production of compositions suitable for impregnating, for coatings, and for the manufacture of filaments and thin, strong, transparent films or sheets suitable for wrapping and packaging various articles, such as foodstuffs. In still other instances, suitable operational and compounding modifications have been found, to permit the production of both soft and hard rubbery zein plastics, potentially of diverse utility for the manufacture of rubberlike gaskets, stoppers, jar rings, and the like.

For whatever purpose an aldehyde-cured prolamine composition is designed, however, the process of this invention is applicable to the stage or stages of the process of manufacture involving aldehyde curing of the prolamine.

From the foregoing discussion, it will be realized that considerable economic interest attaches to the effective large scale production and utilization of the various types of prolamine compositions. However, this field has not been expanded and exploited to the extent which would be anticipated, in large measure due to the inadequacies of prior production methods, and the serious operational limitations imposed thereby.

It is an object of this invention to overcome what has constituted the most dominant of these operational inadequacies, by providing agents for the control of the aldehyde curing of a prolamine composition.

At normal temperatures, such as 20° C., the rate of reaction between prolamine and aldehyde, unlike the action of aldehyde with other proteins carrying free amino groups, is slow, requiring approximately six months or more; and it is of a different nature than occurs at higher temperatures. This rate of reaction increases, however, with increasing temperature, and at elevated temperatures in the general range of, say, from 60° C. to 100° C., reaction between prolamine and aldehyde proceeds fairly rapidly. Since plastic mixing or milling operations in the production of prolamine compositions are preferably conducted in the general range of from 70° C. to 90° C., attempts at these temperatures to incorporate the aldehyde in any considerable concentration prior to or during such mixing operations result in a rapid curing of the prolamine composition. In many instances, aldehyde curing of the prolamine goes forward with such rapidity under these mixing conditions that a state of final cure may be attained and the resultant mass which is then not thermoplastic or moldable is spoiled. Consequently plastic milling time in the forming of prolamine aldehyde compositions or plastics has had to be kept to a minimum, thereby often rendering practically impossible entirely satisfactory plasticization of the composition and the securing of desired properties, such as maximum tensile strength in the final products. For the foregoing reasons, it has been particularly difficult in the commercial production of pigmented aldehyde-cured prolamine compositions, to effect dispersion of pigments and fillers due to the heat generated in such operation and the extended periods of time necessary.

It is an object of this invention to provide agents for controlling the aldehyde-cure of prolamine compositions while permitting greatly increased periods of mixing time without premature curing as a result.

Molding and curing are generally carried out at higher temperatures such as 120° C. to 150° C., but even so, the curing rates are not as fast as desirable and scorching of the protein often occurs in such curing. Attempts to shorten the time of cure of aldehyde-cured prolamine compositions have resulted in several expedients, none of which has been completely successful since these also increase the curing rate during the mixing period. For example, it has been proposed to conduct the aldehyde curing of zein compositions in the presence of an acid as accelerator, or of an acid promoted by a secondary accelerator of ammonia or of primary amines, as accelerator.

It is an object of this invention to provide agents for controlling the aldehyde-curing of prolamine compositions in a simple, direct manner without incurring the technical and operational difficulties to be anticipated in the use of accelerators such as described by the prior art.

A means which has been proposed to reduce the aldehyde curing of prolamine compositions during compounding operations is the use of urea which combines with and remains in combination with the aldehyde at normal and compounding temperatures, but which liberates some free aldehyde in the range of curing temperatures. The utilization of urea to reduce the aldehyde curing of prolamine compositions prior to curing operations is, however, characterized by undesirable consequences which render it impractical for the production of many prolamine compositions. For example, urea is capable of reacting with formaldehyde to form resinous products. When urea is employed as an aldehyde carrier in the production of prolamine compositions, this reaction can and does proceed irreversibly between urea and aldehyde to form resinous products characteristic of urea-formaldehyde resin type linkages. Such products are brittle, hard resins, and their presence consequently modifies the properties of the prolamine composition produced. In many instances, this renders production of prolamine compositions by predetermined properties unlikely, and in many instances effectively precludes any possibility of producing prolamine compositions characterized by special properties conferring potentially diverse and economically attractive utility. For example, I have found in the production of soft rubberlike zein plastics, offering attractive potentialities as rubber substitutes, that the use of urea to retard aldehyde cure of zein compositions at temperatures below curing temperatures invariably results in the formation of resinous products having characteristics which indicate formation of urea-formaldehyde resin type linkages. In the cured product such resins impart qualities such as, for example, increasing brittleness and decreasing ability to withstand flexing, particularly upon aging, which render the otherwise desirable product totally unfit for commercial application in the important and economically attractive field of rubber substitutes. Also as little of the formaldehyde is given up by the urea-formaldehyde product to the protein the actual development of cure is interfered with and is of uncertain degree.

It is an object of the present invention to provide agents for controlling the aldehyde-curing of prolamine compositions without the attendant formation of undesired resinous products as, for example, the formation of brittle resins characteristic of the urea-formaldehyde resin type linkages, said object permitting, in consequence, the production of either soft or of hard rubberlike prolamine compositions having utility as rubber substitutes for gaskets, stoppers, jar rings, tires, and the like.

It is an object of this invention to provide agents for increasing compounding time in the production of aldehyde-cured prolamine compositions, when this is desired in order to permit smoother and more thorough incorporation of ingredients into the composition, prior to curing operations, thus bringing about a more nearly homogenous composition with resultant improvement in cured product qualities, while also providing for controlling the aldehyde-cure of prolamine compositions.

It is a further object of this invention to provide a more or less universal process for controlling the aldehyde-cure of prolamine compositions so that the said process may be suitable for this purpose whatever the type of aldehyde-cured prolamine composition it is desired to produce.

Other and ancillary objects and advantages of this invention will be apparent from the detailed description, examples and explanations hereinafter set forth.

As fully set forth and described in my co-filed application Serial No. 546,226, filed July 22, 1944, I have made the surprising discovery that unsymmetrical substituted carbamides of the type:

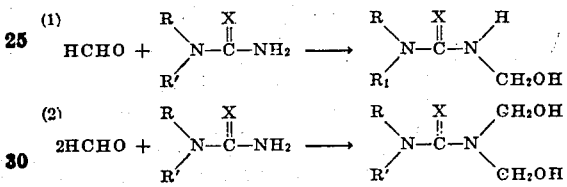

wherein R represents a hydrogen atom or organic radical and R' represents an organic radical, may be effectively employed to control the rate of aldehyde-cure of prolamine compositions. In this formula X stands for oxygen, sulfur, or imido (=NH), respectively, according as the unsymmetrical carbamide is a urea, thiourea, or guanidine derivative. Carbamides of this type have been found to possess the ability to enter into chemical reaction with aldehydes to form compounds. This reaction between an aldehyde and such mono-, and di-substituted carbamides to form the mono-, and di-aldehyde derivatives may be represented, in the case of formaldehyde, by the following equations:

(1)
$$HCHO + \underset{R'}{\overset{R}{>}}N-\overset{\overset{X}{\|}}{C}-NH_2 \longrightarrow \underset{R'}{\overset{R}{>}}N-\overset{\overset{X}{\|}}{C}-N\underset{CH_2OH}{\overset{H}{<}}$$

(2)
$$2HCHO + \underset{R'}{\overset{R}{>}}N-\overset{\overset{X}{\|}}{C}-NH_2 \longrightarrow \underset{R'}{\overset{R}{>}}N-\overset{\overset{X}{\|}}{C}-N\underset{CH_2OH}{\overset{CH_2OH}{<}}$$

wherein R represents a hydrogen atom or organic radical, R' represents an organic radical, and X stands for oxygen, sulfur or an imido group (=NH). The products of reaction between aldehydes and the unsymmetrical mono-, and di-substituted carbamides, being characterized by the presence of methylol or substituted methylol groups, are hereinafter identified as mono-, and di-alkylols of unsymmetrical carbamides. It will be apparent from inspection of the equations shown above that depending upon whether one or two moles of aldehyde are reacted with each mole of mono-, or di-substituted carbamides there will be formed, respectively, the corresponding mono-, or di-alkylols of the unsymmetrical carbamide employed.

I have also found that this reaction between aldehydes and mono- or di-substituted carbamides is reversible. That is to say, under suitable conditions of temperature, either or both the mono- and di-alkylols of a substituted carbamide formed, will react to revert to the aldehyde and the substituted carbamide. I have discovered that by proper choice of conditions this phenomenon may be effectively utilized to provide a method for controlling the aldehyde-cure of prolamine compositions. Thus, for example, if an unsymmetrical mono-, or di-substituted urea or carbamide be reacted with an aldehyde, whether formaldehyde (as, say, trioxymethylene), glyoxal, or acetaldehyde, the respective hydroxy compounds which, in the case of formaldehyde, are mono-, and/or di-methylol compounds, are formed. Since these hydroxy or alkylol compounds are relatively stable, i. e., do not react to form a urea, thiourea, or guanidine and liberate aldehyde, at temperatures below about 100° C., they may be added to the prolamine batch prior to plastic compounding operations, which may then be thoroughly accomplished at temperatures below about 100° C. without danger of premature aldehyde-curing of the prolamine composition. This is not to imply that mono-, and/or di-alkylols need necessarily be added to the batch prior to compounding, since addition may be delayed until it is desired to undertake curing operations. In practice, however, it will generally be found preferable to incorporate the mono-alkylol or di-alkylol compound during milling operations.

I have further discovered that unsymmetrical mono- and di-substituted ureas and their mono- and di-aldehyde derivatives of the type exemplified, described and discussed above, are not capable of forming resinous products with aldehydes, such as linkages of the urea-formaldehyde resin type, since due to the unsymmetrical substitution of one of the urea nitrogens it is not possible for the aldehyde to form chain-like structures with these as readily occurs with urea. Compounding operations may, therefore, be conducted over relatively extended periods of time without the possibility of urea-aldehyde type resin formation with the attendant deleterious effects on the cured products already discussed. The advantages of extended compounding times, hereinabove set forth, are to permit more thorough incorporation of ingredients, resulting in a more homogeneous composition, and to permit compounding at higher temperatures than heretofore possible for longer periods of time.

While the use of unsymmetrical mono- or di-substituted carbamides of the type set forth has been found to give the attractive results described, attempts to employ substituted ureas, thioureas, or guanidines carrying substituents on both nitrogens have been unsuccessful, and such carbamide derivatives show none of the desired cure retarding effects at the mixing temperatures. Thus, not only is the substituted character of one of the said carbamide nitrogens necessary, but for successful use in the prolamine aldehyde plastic composition field, the other nitrogen in the carbamide compound must be an unsubstituted amino group ($NH_2$), that is, the carbamides must definitely be of an unsymmetrical nature. Thus, symmetrical NN' diphenyl guanidine and symmetrical NN' diethanol urea are without utility, possibly because their aldehyde compounds, if any, are weaker than the tendency of the aldehydes to react with the prolamines.

After the completion of compounding operations, cure of the resultant prolamine composition carrying the carbamide-aldehyde compound, may be effected merely by raising the temperature of the mass to the temperature at which reversal of the reaction, by which the mono-, and/or di-alkylols were formed, occurs to reform the original mono-, and/or di-substituted carbamides, and to liberate aldehyde. Reaction between aldehyde and prolamine may then proceed, to effect curing of the composition in normal fashion.

It is pointed out that, if both mono- and di-alkylols have been added to the same batch, reversal of the reactions whereby these compounds were formed is not necessarily sharp as if there were a temperature which is critical and precise between the two directions of reaction. Rather, there will be found a safe range of temperature for compounding the mixture to minimize curing, and a higher range of temperature wherein liberation of the aldehyde and curing takes place. These ranges may be adjacent to each other or more or less widely separated. It has been found that the first molecule of aldehyde to react with the unsubstituted carbamides attaches itself more strongly than the second molecule necessary to form the di-alkylol compound. The di-alkylol compounds start to give off free aldehyde at temperatures lower than those at which much free aldehyde is given off by the monoalkylol compounds. These differences lead to differences in curing rate at different temperatures dependent upon how much of each of the mono- and/or di-alkylol compounds are present to function. A still further expedient for control of the curing rate is the employment of alkylol derivatives of several unsubstituted carbamides at one time.

Exactly what occurs then, at a particular temperature, will depend upon the relative reactivities of the materials involved including the prolamine, also upon the uniformity or homogeneity of mixture, upon actual concentrations, and upon other factors. Therefore, I wish it to be understood that although the mechanism of the reaction may be positively expressed there is no assurance that critical temperatures or transition points are bound to be encountered. Investigation has established that for any given mixture there is a safe temperature range in which it may be compounded, and when compounded, be held; and a higher range wherein release of aldehyde is effected and unretarded curing occurs either at the normal rate as in acid accelerated compositions or at a rate which permits a practical curing operation.

Normally, I have found my aldehyde compounds of unsymmetrical carbamides to be readily formed and stable and to prevent cure at relatively low temperatures, such as are suitable for mixing operations and for storing materials, and further, that decomposition giving the free aldehyde occurs readily above these normal mixing and storing temperatures. There is no sharp line of division, and the general range of transition in which aldehyde begins to form may vary according to the particular compound present. Merely as a general statement, it may be considered that 100° C. is illustrative of a temperature at and below which the compounds are readily formed and stable and may be effectively used to retard cure during mixing operations, and that at temperatures considerably above 100° C. the compounds release aldehyde for curing. It will be noted in the examples that curing may be effected below 100° C. in some cases, and that uncured mixtures may be maintained safely in uncured condition for certain periods of time at temperatures over 100° C. Thus, merely as a general statement, it may be said that the present curing agents give effective practical increase in the mixing and milling time at temperatures below 100° C., and they exert no retarding effect at curing temperatures well above this, for example at 120° C. to 150° C. At the latter temperatures rapid cures are commonly desired, and can be readily effected by the present invention.

In the production of prolamine aldehyde compositions and plastics, wherein acid or acid-forming type plasticizers are employed, such as abietic acid, dibutyl tartrate, monomethyl azelate, lactic acid, ricinoleic acid, and the like, the mono-, and di-substituted alkylol carbamides of the types described act to retard curing of the prolamine composition at temperatures below curing temperatures, but are inactive, i. e., neither significantly retard nor accelerate such curing, at conventional curing temperatures. While adding acids or acid type salts, such as ammonium chloride to a prolamine plastic mass has been found to accelerate prior art curing with aldehydes at elevated temperatures, it has also accelerated curing at lower mixing and milling temperatures, making such use hazardous. When, however, the unsymmetrical alkylol carbamide retarders are first added to a prolamine plastic batch, the acid type accelerators may then be milled in without this accelerating and premature curing occurring during mixing. However, the full accelerating effect of such substances is secured and is not lost, at the elevated curing temperature conditions.

In plastic prolamine masses there may be used neutral plasticizers such as diethylene glycol, triethylene glycol, hexaethylene glycol or a fatty amide such as lauryl amide, or the like. The alkylol compounds for the present invention are generally soluble in such plastic masses, and it is found that not only may available formaldehyde be more uniformly dispersed throughout the mass but that due to the solubility of the said alkylol compounds, the aldehyde is made more readily available throughout the mass at the curing temperature with the resultant effects that the actual curing rate at curing temperatures is definitely accelerated and the curing is definitely more homogeneous throughout the mass as contrasted to curing with the alkylol compounds without a solvent ingredient therefor in the mass. Thus, frequently with neutral plasticizers which give prolamine masses, which cure relatively slowly, I am able to secure an acceleration of cure at the high temperatures which is of importance in completing the cure before thermal decomposition or scorching of the protein occurs.

As hereinabove described, I have discovered that the mono- and di-alkylol derivatives of unsymmetrical substituted carbamides of the type:

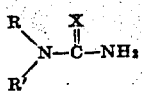

are surprisingly effective as agents for controlling the aldehyde-cure of prolamine compositions. I have stated that in this formula R represents a hydrogen atom or an organic radical, and that R' represents an organic radical, while X represents oxygen, sulphur, or an imido group (=NH). I have discovered that the mono- and di-alkylol derivatives of compounds wherein R and/or R' are of the types listed below, are representative of those conforming structurally with this formula, and are suitable for the processes of this invention. I wish it specifically understood, however, that I do not intend this invention to be limited to the alkylol derivatives of these compounds only, or indeed to these types, except as hereinafter set forth in the appended claims:

Type 1.—An organic radical present is alkyl.

R=hydrogen; R'=alkyl

Example: Monoethyl urea
(C₂H₅)NH—CO—NH₂

R=alkyl; R'=alkyl

Example: N,N-diethyl urea
(C₂H₅)₂N—CO—NH₂

I have discovered that alkylol derivatives of compounds of this type which are most suitable for the processes described herein are those in which the number of carbon atoms in each alkyl group does not exceed 12 carbon atoms.

Type 2.—An organic radical present is cyclic.

R=hydrogen; R'=furfuryl

Example: Monofurfuryl urea

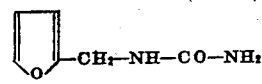

R=alkyl; R'=cycloalkyl

Example: N,N-methyl cyclohexyl urea

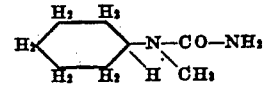

Type 3.—An organic radical present is hydroxyalkyl.

R=hydrogen; R'=hydroxyalkyl

Example: Monoethanol urea
HOCH₂—CH₂—NH—CO—NH₂

R=hydroxyalkyl; R'=hydroxyalkyl

Example: N,N-di(2-hydroxypropyl) urea
(CH₃—CHOH—CH₂)₂N—CO—NH₂

Type 4.—An organic radical present is aryl.

R=hydrogen; R'=aryl

Example: Monophenyl thiourea

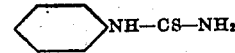

R=aryl; R'=aryl

Example: N,N-diphenyl guanidine

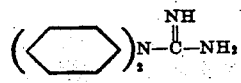

Type 5.—An organic radical present is substituted aryl.

R=hydrogen; R'=substituted aryl

Example: Paramethoxy monophenyl urea

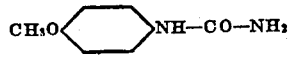

R=substituted aryl; R'=substituted aryl

Example: Di-(orthomethoxy) phenyl urea

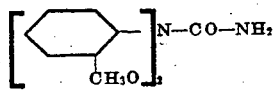

Alkylol derivatives of aryl amino and phenolic substituted unsymmetrical carbamides cannot however be employed as cure retarders as these would be doubly reactive and resin-forming.

Type 6.—An organic radical present is a secondary or tertiary aminated alkyl.

R=hydrogen;

R'=aminated alkyl carrying secondary or tertiary amino groups but no primary amino groups Example: N-mono(hydroxyethyl ethylamine) urea

HOCH₂—CH₂—NH—CH₂—CH₂—NH—CO—NH₂

N-mono (ethylmorpholine) urea

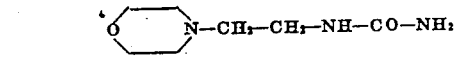

Further specific examples, the alkylol derivatives of which are useful, are mono-butyl urea, mono-lauryl urea, allyl thiourea, N-N-diethanol urea, mono-ethanol guanidine, N-mono-ethyl- N-mono-ethanol urea, N-mono-phenyl-N-mono-ethanol urea, mono-(2-hydroxy propyl) urea, N-mono-2(butanol-1) urea, N-mono-2(2-methyl-1-propanol) urea, N-mono-2(2-methyl-1-3-propanediol) urea, N-mono-(trihydroxy-methyl-methane) urea, N-mono-2(2-ethyl-1-3-propanediol) urea, mono-phenyl urea, mono-phenyl guanidine, N-N-phenyl-methyl urea, N-N-phenyl-butyl urea, N-N-diphenyl urea, and mono-benzyl urea. Many of the unsymmetrical carbamides, particularly those carrying hydroxyalkyl organic radicals, are liquids and solvents in themselves for the prolamines and as such they are of considerable aid in speeding up the plastic mixing and insuring uniformity of mix.

I have discovered that the mono- and di-alkylol unsymmetrical substituted carbamide derivatives hereinabove described and characterized extend surprisingly functional aid in the production of prolamine plastic coatings, films and the like, by virtue of the fact that these compounds are soluble in alcohol, dioxane and the like prolamine solvents. When added to batches for the production of such coating or lacquer type compositions, these compounds, being stable at the usual drying temperatures of about 100° C. prevent loss of aldehyde from the wet coatings which loss would otherwise prove excessive, and has heretofore necessitated the uneconomical addition to the coating lacquers of quantities of aldehyde far in excess of that required for complete prolamine cure. Loss of aldehyde, in addition, presented an extreme hazard to the health of workers engaged in such operations, and one which could be surmounted only with the most elaborate safeguards. However, since these mono- and di-alkylol derivatives decompose with the liberation of aldehyde at temperatures above about 100° C. and particularly so at the conventional curing temperature of 135° C., operations directed to curing the dried coating compositions are not hampered nor in any way interfered with, but are, on the contrary, facilitated. Compositions produced in this way may be hard, durable, water-resistant coatings, suitable for coating household utensils, industrial ware, and the like, or they may be non-blushing, flexible, transparent films, resistant to softening when dipped in water.

As is well-known, the prolamines are a group of proteins characterized by solubility in aqueous alcohol solutions which are found only in certain cereal grains. The well-known prolamines include zein, found in corn, gliadin, found in wheat, hordein, found in barley, secalin from rye, sorghumin from sorghum, and the alcohol soluble protein extractable from oats. The prolamines constitute a large portion of the protein found in the starchy or endosperm parts of the cereal grains and they are isolated from such starchy portions after the grains have been degerminated, as for example in cornstarch manufacture by the wet-milling process or in the manufacture of wheat or other flours by the dry-milling process. The starches may be removed by mechanical washing action as in the preparation of wheat gluten, by wet kneading of the floury mixture or they may be removed as in the commercial separation of cornstarch. The protein concentrates thus secured may then be extracted by aqueous alcohol or otherwise treated to produce more concentrated or purified alcohol-soluble prolamines as is well-known in the art for producing zein and gliadin. These various prolamines may be used to manufacture prolamine compositions and plastic products and be cured with formaldehyde, and in each case the alkylol derivatives of the unsymmetrical carbamides may be employed to retard such curing action during mixing or in storage and to effect control of the curing action. Certain modifications of the prolamines have become available, such as for instance zein acetate, or zein modified by heat and water-vapor or water treatment, and when compositions or plastics are formed of these with aldehydes I have found the retarders to act as effectively with such modified prolamines as with the prolamines themselves.

Prolamine plastic compositions may also be formed from the crude protein concentrates derived directly from the de-germinated cereals when these contain a considerable proportion of a prolamine. Thus, as a suitable corn protein for forming plastics we may use the corn gluten resulting from the commercial separation of cornstarch in the wet-milling process which may contain from 40% to 65% of corn proteins primarily of prolamine nature, a large part being the alcohol-soluble prolamine and the remainder of the protein being the alcohol-insoluble modified prolamine modified by heat and water treatment. The non-protein remainder of the gluten consists primarily of starch with small quantities of cellulosic bodies and fatty substances. Partially purified corn glutens such as those produced in Shildneck patent, U. S. No. 2,274,004, by further removal of starch with acids or as shown in Schopmeyer patent, U. S. No. 2,310,104, wherein fatty materials are removed and which contain 60% to 100% protein content, can obviously be used in making cured corn protein compositions and plastics with aldehydes. In making prolamine compositions with these various impure prolamine mixtures and from similar prolamine-containing mixtures made from other cereal grains, the alkylol derivatives of the unsymmetrical ureas have been found to operate as aldehyde-cure-controlling reagents and retarders during the mixing stages. It will be understood that as I have used the word "curable prolamine-base protein" in the description here given and in the appended claims, I include by such term not alone the prolamines from the various cereal grains but also include mixtures of cereal proteins produced from the endosperm which contain a considerable proportion of prolamine, and also include by such term proteins which are modified or chemically altered prolamines capable of reacting and cure with aldehydes.

Preparation and utilization of mono- and di-alkylol mono-, and di-substituted carbamides as means for controlling the aldehyde cure of prolamine compositions are illustrated in the following examples which, however, I intend as typical and informative only, and as in no way to impose limitations upon the invention, since it is intended to cover all equivalents and all modifications within the scope of the claims hereinafter set forth. As stated in my co-pending application Serial No. 546,226, filed July 22, 1944, mono-substituted carbamides of the type:

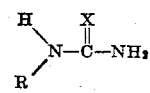

may be prepared by the heating of primary amines with suitable carbamides. Di-substituted carbamides of the type:

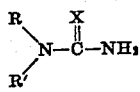

may be prepared by the similar reaction of secondary amines with suitable carbamides. The prepartion of these compounds forms no part of the present invention, these methods being well known.

Example 1

One mole of formaldehyde as solid trioxymethylene was mixed with one mole of unsymmetrical monoethanol urea and the mixture stirred and heated to 90° C. The product, predominantly unsymmetrical mono-methylol-monoethanol urea, was a thick syrupy liquid with a faint aldehyde odor, barely decomposing at 100° C., but rapidly decomposing at 120° C. with the consequent liberation of formaldehyde.

Example 2

Unsymmetrical mono-methylol-diethanol urea was prepared according to the method of Example 1, above, using diethanol urea in place of the monoethanol specified in Example 1.

Example 3

Two moles of formaldehyde as solid trioxymethylene were mixed with one mole of unsymmetrical monoethanol urea and the stirred mixture maintained at a temperature of about 90° C. for a period of 1 to 2 hours. The product, predominantly unsymmetrical di-methylol-mono-ethanol urea, smelled strongly of aldehyde, and barely decomposed at 100° C., but decomposed rapidly at 120° C. with the consequent liberation of formaldehyde.

Example 4

Unsymmetrical di-methylol-diethanol urea was prepared according to the method of Example 3, above, using one mole of diethanol urea in place of the monoethanol urea specified in Example 3.

Example 5

To obtain an aqueous solution of mono-methylol derivative, one mole of unsymmetrical diethanol urea was mixed with aqueous glyoxal of 30% strength by weight in amount sufficient to supply one mole of aldehyde. Solution of the urea in the glyoxal and chemical reaction therewith were readily effected, care being taken to maintain the temperature of the reaction mixture in the general range below 100° C. Heating for one hour at 70°–85° C. is sufficient to complete the reaction. The product so obtained was an aqueous solution of unsymmetrical mono-methylol diethanol urea.

Example 6

Unsymmetrical di-methylol monoethanol urea in aqueous solution was prepared by mixing one mole of unsymmetrical monoethanol urea with aqueous formaldehyde of 40% strength by weight in amount sufficient to supply two moles of aldehyde, and effecting solution of urea in aldehyde and chemical reaction therewith by maintaining the mixture at a temperature of about 55–65° C. for a period of about two hours.

Example 7

Anhydrous glyoxal compound with the unsymmetrical diethanol urea was prepared by mixing one mole of said urea with aqueous glyoxal of 30% strength by weight in quantity sufficient to provide one-half mole of dialdehyde, slowly heating the mixture until a temperature of 100° C. was attained and distilling off the water to obtain the desired anhydrous compound. Since these products decompose very slowly at temperatures up to about 100° C. and slowly at temperatures in the general range from 100° to 110° C., loss of aldehyde is substantially precluded during such distillation operations. At a temperature of about 120° C. and at temperatures in excess thereof, however, these products decompose rapidly with the consequent liberation of aldehyde.

Example 8

Unsymmetrical monoethanol urea was heated to melting and permitted to cool to a thick, syrupy, supercooled liquid. One mole of this material was mixed with one mole of acetaldehyde, the temperature of the mixture being maintained in the general range of 4° to 10° C. Since acetaldehyde boils at about 21° C. at atmospheric pressure, a temperature lower than about 10° C. was used to avoid undue material loss through evaporation. This is particularly important since the reaction between acetaldehyde and urea is exothermic in nature, and adequate means must therefore be provided to ensure removal of reaction heat and maintenance of low temperatures for the reaction mixture. The clear, amber fluid product barely decomposed at 100° C. but decomposed rapidly at 120° C. with the consequent liberation of aldehyde.

Example 9

Unsymmetrical diethanol urea, heated to melting and allowed to cool to a thick, syrupy supercooled liquid was mixed in molal quantities with acetaldehyde as described and under the conditions specified in Example 7, above. The product was again a clear, amber fluid, barely decomposing at 100° C., but decomposing rapidly with the consequent liberation of formaldehyde at 120° C. and at temperatures in excess thereof.

Example 10

Plastic mixes were made as follows:

| Recipe (parts by weight) | Sample | | | |
|---|---|---|---|---|
| | A | B | C | D |
| Zein | 100 | 100 | 100 | 100 |
| Diethylene Glycol | 100 | 100 | 100 | 100 |
| Trioxymethylene | 1.5 | 1.5 | None | None |
| Urea | None | 5 | None | None |
| Unsymmetrical Mono-Methylol Diethanol Urea | None | None | 8.9 | 5.0 |

Time required for complete curing of the resultant compositions at various temperatures is shown in the following table:

| Temperature (° C.) | Time (Minutes) | | | |
|---|---|---|---|---|
| | Sample A | Sample B | Sample C | Sample D |
| 70 | 900 | 1500+ | 430 | |
| 90 | 250 | 1500+ | 160 | 350 |
| 130 | 60 | 80 | 50 | 50 |
| 140 | 40 | | 30 | 30 |
| 150 | 25 | | 12 | 15 |

In this instance, the trioxymethylene was insoluble in the mix at room and elevated temperatures. At curing temperatures, in the case of sample A, the trioxymethylene decomposed liberating gaseous formaldehyde which then reacted with the zein. Unsymmetrical monomethylol diethanol urea, however, was soluble in and miscible with the plastic mix (samples C and D).

It is evident that the unsymmetrical monomethylol diethanol urea served to accelerate curing of the mix both at mixing and curing temperatures. The accelerated curing time noted at mixing temperatures is insufficient to necessitate undesirably short mixing operations. The acceleration of cure effected at curing temperatures is, however, of extreme importance, since charring and other types of heat decomposition are quite evident in this instance, using the prolamine, after 70 minutes at 130° C., after 45 minutes at 140° C., and after 30 minutes at 150° C. The operative molding advantages of short curing time at high temperatures permitted by this invention are, therefore, of the utmost practical importance.

*Example 11*

Plastic mixes were made as follows:

| Recipe (parts by weight) | Sample | | | | | |
|---|---|---|---|---|---|---|
| | A | B | C | D | E | F |
| Zein | 100 | 100 | 100 | 100 | 100 | 100 |
| Dibutyl Tartrate | 100 | 100 | 100 | None | None | None |
| Diethylene Glycol | None | None | None | 100 | 100 | 100 |
| Glyoxal (Aqueous Solution of 30% by weight) | 5 | 5 | 5 | 5 | 5 | None |
| Unsymmetrical Monoethanol Urea | None | 5 | None | 5 | None | None |
| Unsymmetrical Diethanol Urea | None | None | 5 | None | 5 | None |
| Reaction Product—Example 6 | None | None | None | None | None | 8.9 |

Time required for complete curing of the resultant compositions at various temperatures is shown in the following table:

| Time (Minutes) for Sample— | Temperature (°C.) | |
|---|---|---|
| | 90 | 130 |
| A | | 20 |
| B | 1440+ | 50 |
| C | 1440+ | 50 |
| D | 1440+ | 35 |
| E | 1440+ | 35 |
| F | 1440+ | 40 |

It is apparent that cure of the resultant compositions was effectively retarded at 90° C. suitable as a mixing temperature, but was not interfered with at 130° C. which is a conventional curing temperature. Furthermore, these cured products were plastic in nature, substantially water and alcohol insoluble, and equal in all respects to compositions cured directly with glyoxal or according to the method of my co-filed application Serial No. 546,226, filed July 22, 1944.

*Example 12*

The following plastic mix was made:

Recipe (parts by weight):
  Zein _____ 100
  Dibutyl tartrate _____ 50
  Santicizer No. 8 (mixed ortho-, para toluene ethyl sulfonamide) _____ 10
  Rosin _____ 20
  Unsymmetrical mono-methylol diethanol urea _____ 15

These constituents were dissolved in 650 parts by weight of a solvent mixture composed of 9 parts by weight of 85% (on a weight basis) aqueous alcohol and 1 part by weight of methyl Cellosolve. The resultant solution was cast upon slightly waxed glass surfaces, and was used to coat wooden kitchenware. The articles were then oven-dried up to a temperature in the range 90 to 100° C., and, when dry, cured in an oven at a temperature of about 130° C. for periods of about one-half to one hour. The finished kitchenware exhibited hard, durable, water-resistant coatings. From the finished glass surfaces were stripped transparent, flexible films, which did not spot nor soften greatly when dipped in water. During the drying of the lacquer and the curing of the deposited film, the amounts of aldehyde odor noticeable were extremely minor and not particularly objectionable, and obviously the cured films were completely cured, thus avoiding the necessity of large quantities of aldehyde and the nuisance of such aldehyde vapors when attempting to use the simple aldehydes.

*Example 13*

The following mix was made:

Recipe (parts by weight):
  Clay _____ 100
  Water _____ 100
  Corn-gluten _____ 25
  Sulfonated castor oil _____ 3.5
  Ammonium wood rosinate _____ 5
  Monomethylol diethanol urea _____ 4
  Ammonium hydroxide _____ 0.8

The resultant aqueous composition exhibited desirable properties as a paper coating composition. Since the methylol unsymmetrical substituted carbamides of the types characterized herein are stable below about 100° C., they are, as illustrated above agents for incorporating aldehyde into coating compositions. Although the advantages of incorporating aldehydes into such compositions are well known to the art, realization of such advantages has heretofore been precluded by premature gelation difficulties, and by the health hazards involved as discussed in a previous example. The above composition was then coated on paper in a paper-coating machine, processed in the conventional manner, and then passed through a tunnel at 135° C. to complete curing. The resultant paper exhibited superior qualities, particularly with regard to water-resistance, over that coated in the usual manner without incorporation of the methylol unsymmetrical substituted carbamide.

The use of the aldehyde-controlling unsymmetrical carbamides in the forming of the plastic masses prevents such premature curing and batch losses, as expressed in the appended claims.

I claim:

1. The process of curing aldehyde-reactive prolamine-base protein which comprises compounding to substantial homogeneity at a mixing temperature below a curing temperature in the vicinity of 100° to 120° C. a non-liquid mass comprising essentially and primarily said protein and an agent which releases curing aldehyde at curing temperatures, said agent being an addition product of curing aldehyde at the primary amino group of unsymmetrical substituted carbamide of the formula RR'N—CX—NH$_2$ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature upwardly from the range of 100° to 120° C., whereby the said addition product releases curing aldehyde under curing conditions and said released aldehyde cures said protein.

2. The process of curing aldehyde-reactive prolamine-base protein which comprises compounding to substantial homogeneity at a mixing temperature below a curing temperature in the vicinity of 100° to 120° C. a non-liquid mass comprising essentially and primarily said protein and an agent which releases formaldehyde at curing temperatures, said agent being an addition product of formaldehyde at the primary amino group of unsymmetrical substituted carbamide of the formula RR'N—CX—NH$_2$ wherein R represents a member of the group consisting of hydrogen and organic radicals inert to formaldehyde, R' represents an organic radical inert to formaldehyde, and X represents a member of the group consisting of =O, =S, and =NH; and heating the resulting compound to a curing temperature upwardly from the range 100° to 120° C., whereby the said addition product releases formaldehyde under curing conditions and said released formaldehyde cures said protein.

3. The process of curing aldehyde-reactive prolamine which comprises compounding to substantial homogeneity at a mixing temperature below a curing temperature in the vicinity of 100° to 120° C. a non-liquid mass comprising essentially and primarly said prolamine and an agent which releases curing aldehyde at curing temperatures, said agent being an addition product of curing aldehyde at the primary amino group of unsymmetrical substituted carbamide of the formula RR'N—CX—NH$_2$ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature upwardly from the range 100° to 120° C., whereby the said addition product releases curing aldehyde under curing conditions and said released aldehyde cures said prolamine.

4. The process of curing aldehyde-reactive prolamine which comprises compounding to substantial homogeneity at a mixing temperature below a curing temperature in the vicinity of 100° to 120° C. a non-liquid mass comprising essentially and primarily said prolamine and an agent which releases formaldehyde at curing temperatures, said agent being an addition product of formaldehyde at the primary amino group of unsymmetrical substituted carbamide of the formula RR'N—CX—NH$_2$ wherein R represents a member of the group consisting of hydrogen and organic radicals inert to formaldehyde, R' represents an organic radical inert to formaldehyde, and X represents a member of the group consisting of =O, =S, and =NH; and heating the resulting compound to a curing temperature upwardly from the range 100° to 120° C., whereby the said addition product releases formaldehyde under curing conditions and said released formaldehyde cures said prolamine.

5. The process of curing aldehyde-reactive prolamine-base protein which comprises compounding to substantial homogeneity at a mixing temperature below a curing temperature in the vicinity of 100° to 120° C. a non-liquid mass comprising essentially and primarily said protein, plasticizer for the aldehyde-cured protein, and an agent which releases curing aldehyde at curing temperatures, said agent being an addition product of curing aldehyde at the primary amino group of unsymmetrical substituted carbamide of the formula RR'N—CX—NH$_2$ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature upwardly from the range 100° to 120° C., whereby the said addition product releases curing aldehyde under curing conditions and said released aldehyde cures said protein.

6. The process of curing aldehyde-reactive prolamine-base protein which comprises compounding to substantial homogeneity at a mixing temperature below a curing temperature in the vicinity of 100° to 120° C. a non-liquid mass comprising essentially and primarly said protein, plasticizer for the aldehyde-cured protein, and an agent which releases formaldehyde at curing temperatures, said agent being an addition product of formaldehyde at the primary amino group of unsymmetrical substituted carbamide of the formula RR'N—CX—NH$_2$ wherein R represents a member of the group consisting of hydrogen and organic radicals inert to formaldehyde, R' represents an organic radical inert to formaldehyde, and X represents a member of the group consisting of =O, =S, and =NH; and heating the resulting compound to a curing temperature upwardly from the range 100° to 120° C., whereby the said addition product releases formaldehyde under curing conditions and said released formaldehyde cures said protein.

7. The process of curing aldehyde-reactive prolamine which comprises compounding to substantial homogeneity at a mixing temperature below a curing temperature in the vicinity of 100° to 120° C. a non-liquid mass comprising essentially and primarily said prolamine, plasticizer for the aldehyde-cured prolamine, and an agent which releases curing aldehyde at curing temperatures, said agent being an addition product of curing aldehyde at the primary amino group of unsymmetrical substituted carbamide of the formula RR'N—CX—NH$_2$ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature upwardly from the range 100° to 120° C., whereby the said addition product releases curing aldehyde under curing conditions and said released aldehyde cures said prolamine.

8. The process of curing aldehyde-reactive prolamine which comprises compounding to substantial homogeneity at a mixing temperature below a curing temperature in the vicinity of 100° to 120° C. a non-liquid mass comprising essentially and primarily said prolamine, plasticizer for the aldehyde-cured prolamine, and an agent which releases formaldehyde at curing temperatures, said agent being an addition product of formaldehyde at the primary amino group of unsymmetrical substituted carbamide of the formula RR'N—CX—NH$_2$ wherein R represents a member of the group consisting of hydrogen and organic radicals inert to formaldehyde, R' represents an organic radical inert to formaldehyde, and X represents a member of the group consisting of =O, =S, and =NH; and heating the resulting compound to a curing temperature upwardly from the range 100° to 120° C., whereby the said addition product releases formaldehyde under curing conditions and said released formaldehyde cures said prolamine.

9. The process of curing aldehyde-reactive prolamine-base protein which comprises compounding to substantial homogeneity at a mixing temperature below a curing temperature a non-liquid mass comprising essentially and primarily said protein and an agent which releases curing aldehyde at curing temperatures, said agent being an addition product of curing aldehyde at the primary amino group of unsymmetrical substituted carbamide of the formula RR'N—CX—NH$_2$ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature at which said addition product releases curing aldehyde under curing conditions and said released aldehyde cures said protein.

10. The process of curing aldehyde-reactive prolamine which comprises compounding at a mixing temperature below a curing temperature a non-liquid mass comprising essentially and primarily said protein and an agent which releases curing aldehyde at curing temperatures, said agent being an addition product of curing aldehyde at the primary amino group of unsymmetrical substituted carbamide of the formula RR'N—CX—NH$_2$ wherein R represents a member of the group consisting of hydrogen and organic radicals inert to said aldehyde, R' represents an organic radical inert to said aldehyde, and X represents a member of the group consisting of =O, =S, and =NH; and heating the resulting compound to a curing temperature at which said addition product releases curing aldehyde under curing conditions and said released aldehyde cures said prolamine.

11. The process of curing aldehyde-reactive prolamine which comprises incorporating to substantial homogeneity at a temperature below a curing temperature in the vicinity of 100° to 120° C. a mass including as the essential and reactive ingredients said prolamine and an agent which releases curing aldehyde at curing temperatures, said agent being an addition product of curing aldehyde at the primary amino group of unsymmetrical substituted carbamide of the formula RR'N—CX—NH$_2$ wherein R represents a member of the group consisting of hydrogen and organic radicals inert to said aldehyde, R' represents an organic radical inert to said aldehyde, and X represents a member of the group consisting of =O, =S, and =NH; and heating a non-liquid mass containing said prolamine and said agent to a curing temperature upwardly from a range of 100° to 120° C., whereby the said addition product releases curing aldehyde under curing conditions and said released aldehyde cures said prolamine.

12. The process of curing aldehyde-reactive prolamine which comprises incorporating to substantial homogeneity at a temperature below a curing temperature in the vicinity of 100° to 120° C. a mass including as the essential and reactive ingredients said prolamine, plasticizer for the cured prolamine, and an agent which releases curing aldehyde at curing temperatures, said agent being an addition product of curing aldehyde at the primary amino group of unsymmetrical substituted carbamide of the formula RR'N—CX—NH$_2$ wherein R represents a member of the group consisting of hydrogen and organic radicals inert to said aldehyde, R' represents an organic radical inert to said aldehyde, and X represents a member of the group consisting of =O, =S, and =NH; and heating a non-liquid mass containing said prolamine, said plasticizer and said agent to a curing temperature upwardly from a range of 100° to 120° C., whereby said addition product releases curing aldehyde under curing conditions and said released aldehyde cures said prolamine to a plasticized cured prolamine.

13. The process of curing aldehyde-reactive prolamine-base protein which comprises incorporating to substantial homogeneity at a temperature below a curing temperature in the vicinity of 100° to 120° C. a non-liquid mass containing essentially and primarily said protein and an agent which releases curing aldehyde at curing temperatures, said agent being an addition product of curing aldehyde at the primary amino group of unsymmetrical N—N—diethanol urea; and heating a mass containing said protein and said agent at a curing temperature upwardly from the range of 100° to 120° C., whereby said addition product releases curing aldehyde under curing conditions and said released aldehyde cures said protein.

14. The process of curing aldehyde-reactive prolamine-base protein which comprises incorporating to substantial homogeneity at a temperature below a curing temperature in the vicinity of 100° to 120° C. a non-liquid mass containing essentially and primarily said protein and an agent which releases curing aldehyde at curing temperatures, said agent being an addition product of curing aldehyde at the primary amino group of an unsymmetrical ethanol derivative of urea; and heating a mass containing said protein and said agent at a curing temperature upwardly from the range of 100° to 120° C., whereby said addition product releases curing aldehyde under curing conditions and said released aldehyde cures said protein.

15. The process of curing aldehyde-reactive prolamine-base protein which comprises heating at a curing temperature upwardly from the range of 100° C. to 120° C. a curable non-liquid homogeneous mass of said protein and an agent capable of releasing curing aldehyde at said curing temperature, said agent being an addition product of curing aldehyde at the primary amino group of unsymmetrical substituted carbamide of the formula RR'N—CX—NH$_2$ wherein R represents a member of the group consisting of hydrogen and organic radicals inert to said aldehyde, R' represents an organic radical inert to said aldehyde, and X represents a member of the group consisting of =O, =S, and =NH, whereby the said addition product releases curing aldehyde under curing conditions, and curing said protein by continuation of said heating.

16. The process of curing aldehyde-reactive prolamine-base protein which comprises heating at a curing temperature upwardly from the range of 100° C. to 120° C. a curable non-liquid homogeneous mass of said protein and an agent capable of releasing curing formaldehyde at said curing temperature, said agent being an addition product of formaldehyde at the primary amino group of unsymmetrical substituted carbamide of the formula RR'N—CX—NH₂ wherein R represents a member of the group consisting of hydrogen and organic radicals inert to formaldehyde, R' represents an organic radical inert to formaldehyde, and X represents a member of the group consisting of =O, =S, and =NH, whereby the said addition product releases formaldehyde under curing conditions, and curing said protein by continuation of said heating.

17. The process of curing aldehyde-reactive prolamine which comprises heating at a curing temperature upwardly from the range of 100° C. to 120° C. a curable non-liquid homogeneous mass of said prolamine and an agent capable of releasing curing aldehyde at said curing temperature, said agent being an addition product of curing aldehyde at the primary amino group of unsymmetrical substituted carbamide of the formula RR'N—CX—NH₂ wherein R represents a member of the group consisting of hydrogen and organic radicals inert to said aldehyde, R' represents an organic radical inert to said aldehyde, and X represents a member of the group consisting of =O, =S, and =NH, whereby the said addition product releases curing aldehyde under curing conditions, and curing said prolamine by continuation of said heating.

18. The process of curing aldehyde-reactive prolamine which comprises heating at a curing temperature upwardly from the range of 100° C. to 120° C. a curable non-liquid homogeneous mass of said protein and an agent capable of releasing formaldehyde at said curing temperature, said agent being an addition product of formaldehyde at the primary amino group of unsymmetrical substituted carbamide of the formula RR'N—CX—NH₂ wherein R represents a member of the group consisting of hydrogen and organic radicals inert to formaldehyde, R' represents an organic radical inert to formaldehyde, and X represents a member of the group consisting of =O, =S, and =NH, whereby the said addition product releases formaldehyde under curing conditions, and curing said prolamine by continuation of said heating.

WILLARD L. MORGAN.

REFERENCES CITED

The following references are of record in the file of this patent:

UNITED STATES PATENTS

| Number | Name | Date |
|---|---|---|
| 2,143,023 | Meigs | Jan. 10, 1939 |
| 2,315,402 | D'Alelio | Mar. 30, 1943 |
| 2,331,434 | Sitzler | Oct. 12, 1943 |
| 2,331,926 | Olin | Oct. 19, 1943 |